UNITED STATES PATENT OFFICE.

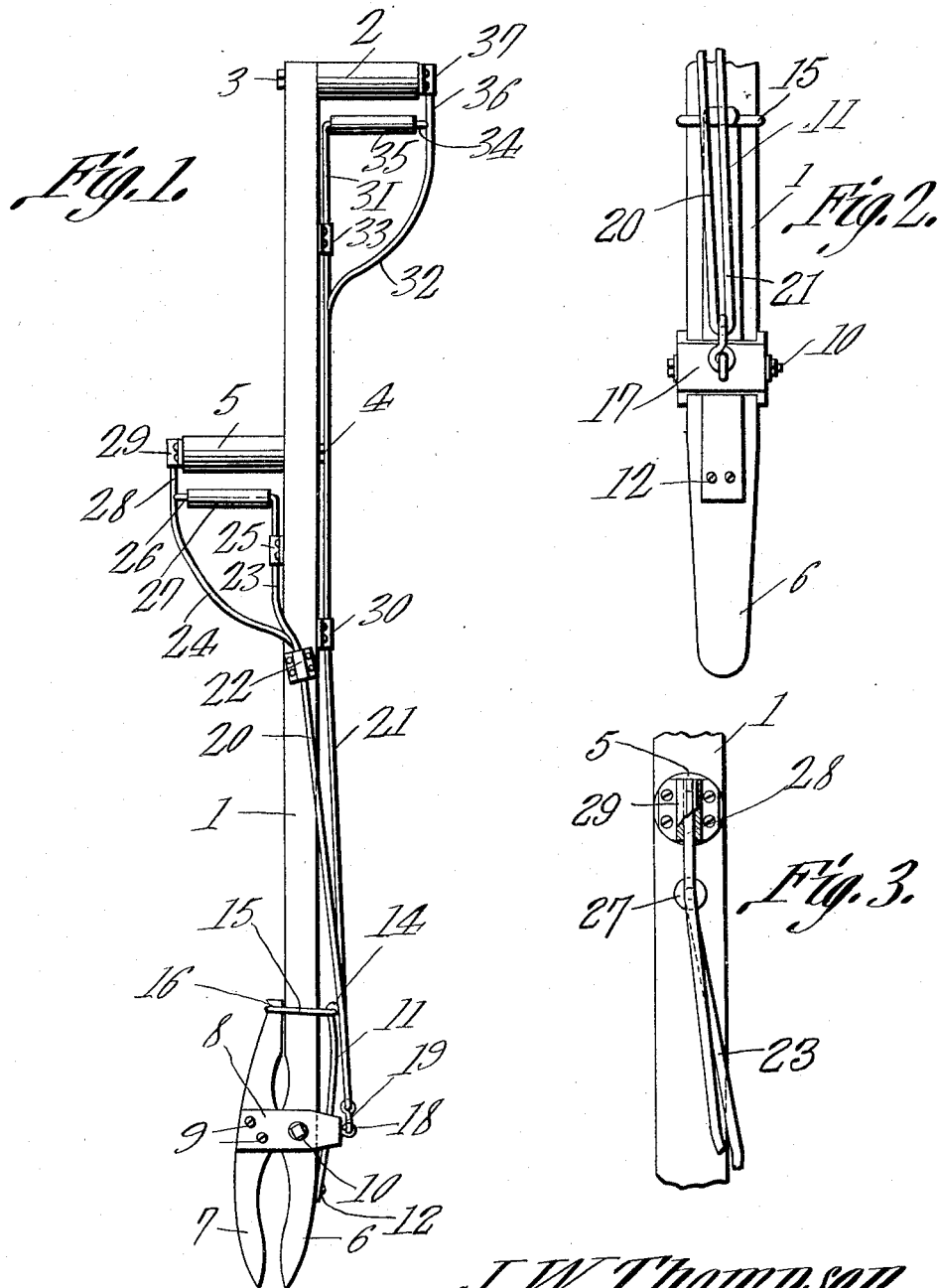

JAMES W. THOMPSON, OF HARLINGEN, TEXAS.

HAND-TRANSPLANTER.

1,007,752.  Specification of Letters Patent.  Patented Nov. 7, 1911.

Application filed January 21, 1911. Serial No. 603,981.

*To all whom it may concern:*

Be it known that I, JAMES W. THOMPSON, a citizen of the United States, and a resident of Harlingen, in the county of Cameron and State of Texas, have invented a new and useful Hand-Transplanter, of which the following is a full, adequate, and complete description.

The device forming the subject matter of this application, is a manually operated device, adapted for the manipulation of small plants, during the transplanting of the same, and during the thinning out of closely growing plants.

The objects of the invention are, to provide, in a transplanter of the sort above referred to, novel mechanism for actuating the movable jaw of the transplanter, and to devise a novel form of hand-actuated means, for the manipulation of said mechanism.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in side elevation; Fig. 2 is a fragmental edge elevation, showing the lower portion of the structure; and Fig. 3 is a sectional edge elevation showing the manner in which the operating elements are slidably connected with the handles.

In carrying out the invention there is provided, as a primary and fundamental element, a body 1, preferably taking the form of a bar. The body 1 is equipped at its upper end, with an outstanding handle 2, preferably held in place by a bolt 3. Secured to the body 1, intermediate its ends, by means of a bolt 4, is a handle 5, the handle 5 projecting in a direction opposite to that of the handle 2. The lower end of the body 1 is thinned, and suitably shaped to form a relatively fixed jaw 6, coöperating with a similarly shaped movable jaw 7, disposed parallel to the jaw 6. An arched yoke 8 is extended around the fixed jaw 6, the extremities of the yoke 8 being secured to the movable jaw 7, as shown at 9. A pivot element 10 is extended through the yoke 8, and through the jaw 6, and thus the movable jaw 7 is operatively connected with the fixed jaw.

In order to maintain the jaws 6 and 7 spaced apart at their operative ends, a spring plate 11 is secured at its lower end, as shown at 12, to the rear face of the fixed jaw 6, the spring plate 11 extending upwardly through and above the yoke 8. The upper end of the spring plate 11 is curved or otherwise adapted, as shown at 14, to engage within one end of a link 15, the link 15 inclosing the body 1, and registering, at its opposite end, in a notch 16, formed in the outer face of the movable jaw 7, adjacent the upper end of the movable jaw. It will be seen that the tendency of the spring plate 11, drawing upon the link 15, will be to maintain the operative ends of the jaws 6 and 7 spaced apart, as clearly shown in Fig. 1.

Mounted in the intermediate portion 17 of the yoke 8, is an eye 18, which, through the instrumentality of a link 19 or the like, is connected with a pair of wires 20 and 21, the wires 20 and 21 being referred to hereinafter as the operating members. From the link 19, the operating members 20 and 21 diverge. The operating member 20 is extended upwardly along one of the lateral edges of the body 1, and is mounted for reciprocation in the body carried guide 22. Above the guide 22, the operating member 20 branches into two segments 23 and 24, the segment 23 lying along the forward face of the body 1, and reciprocating in a guide 25, secured to the body. The segment 24 is spaced from the body 1, and is connected with the segment 23 by a cross bar 26, upon which is mounted a handle 27, located below the handle 5. The upper end 28 of the segment 24, is mounted to slide in a guide 29, secured to the outer end of the handle 5. The operating member 21 extends upwardly along the rear face of the body 1, and is mounted to slide in a body-carried guide 30. Above the guide 30, the operating member 21 diverges in two segments 31 and 32. The segment 31 lies close to the body 1, and slides in a body-carried guide 33. The segment 32 is spaced from the body 1, and is connected with the segment 33 by a cross bar 34, carrying a handle 35, located below the handle 2, the extremity of the segment 32 protruding beyond the cross bar 34, as shown at 36, to register in a guide 37, secured to the outer end of the handle 2.

In practical operation, the handles 2 and 35, upon the one hand, or the handles 5 and 27, upon the other hand, are simultaneously engaged, elevating the operating member 21 in the one instance, and the operating member 20 in the other instance. Either of these operating members, when drawn upwardly, will serve to tilt the yoke 8, thereby advancing the movable jaw 7 toward the fixed jaw 6. When the handles 35 and 27 are released, the spring 11 will operate, in the manner hereinbefore described, to effect a spacing of the jaws 6 and 7. Owing to the fact that the handle-holding loops, comprising the elements 24, 26 and 23 in the one instance, and the elements 32, 34 and 31 in the other instance, are equipped, respectively, with the upstanding fingers 28 and 36, reciprocating severally, in the guides 29 and 37, the handles 27 and 35 will be alined properly, at all times, with the handles 5 and 2, respectively, and a direct tension upon the operating members 20 and 21 will thus be secured.

Having thus described the invention, what is claimed is:—

1. In a device of the class described, a body provided at one end with a fixed jaw; a movable jaw pivotally connected with the fixed jaw; spring means for separating the jaws; primary handles outstanding in opposite directions from the body, at spaced points upon the body; an operating member consisting of diverging branches operatively connected at one end, wih the movable jaw, and provided with handle-forming portions at their other ends, located beneath the primary handles.

2. In a device of the class described, a body provided at one end with a fixed jaw; a movable jaw pivotally connected with the fixed jaw; spring means for separating the jaws; primary handles outstanding in opposite directions from the body, at spaced points upon the body; an operating member consisting of diverging branches operatively connected at one end each, with the movable jaw, and provided with handle-forming loops at their other ends, located beneath the primary handles.

3. In a device of the class described, a body provided at its lower end with a fixed jaw; a yoke extended about the fixed jaw and pivotally connected therewith; a movable jaw held between the arms of the yoke; a spring secured at its lower end to the fixed jaw, and extended upwardly, through the yoke; and a link, surrounding the body, and connected at its ends with the spring and with the movable jaw; a primary handle carried by the body; an operating member connected with the yoke; and a handle upon the operating member, located beneath the primary handle.

4. In a device of the class described, a body provided at its lower end with a fixed jaw; a primary handle outstanding from the body; guides upon the body; an operating member slidable in the guides; a movable jaw pivoted to the fixed jaw, and operatively connected with the operating member; the operating member being equipped with a handle-forming loop, located below the primary handle, said loop being provided with an outstanding finger; and a bearing upon the primary handle, in which the finger is mounted for reciprocation.

5. In a device of the class described, a body provided at its lower end with a fixed jaw; a primary handle outstanding from the body; guides upon the body; an operating member slidable in the guides; a movable jaw pivoted to the fixed jaw and operatively connected with the operating member; the operating member being equipped with a handle-forming portion located below the primary handle, said handle-forming portion being provided with an outstanding finger; and a bearing upon the primary handle, in which the finger is mounted for reciprocation.

J. W. THOMPSON.

Witnesses:
   I. B. McFarland,
   E. J. Blaine.

---

Copies of this patent may be obtained for five cents each, by addressing the "Commissioner of Patents, Washington, D. C."